(12) United States Patent
Ishii

(10) Patent No.: US 6,377,752 B1
(45) Date of Patent: Apr. 23, 2002

(54) ZOOM CAMERA AND ADJUSTING METHOD FOR FIELD RATIO OF ZOOM FINDER OF ZOOM CAMERA

(75) Inventor: Hiroyuki Ishii, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/471,260

(22) Filed: Dec. 23, 1999

(30) Foreign Application Priority Data

Dec. 24, 1998 (JP) .......................................... 10-367171

(51) Int. Cl.⁷ ........................ G03B 17/00; G03B 13/10; G03B 5/02; G03B 17/04
(52) U.S. Cl. ........................ 396/87; 396/379; 396/349
(58) Field of Search ............................ 396/379, 72, 75, 396/76, 81, 87, 349

(56) References Cited

U.S. PATENT DOCUMENTS

| | | | | |
|---|---|---|---|---|
| 5,136,324 A | * | 8/1992 | Tsuboi et al. ............... | 396/132 |
| 5,196,963 A | * | 3/1993 | Sao et al. .................... | 359/699 |
| 5,317,351 A | * | 5/1994 | Takahara et al. ............... | 396/81 |
| 5,774,748 A | * | 6/1998 | Ito et al. ..................... | 396/349 |
| 5,897,227 A | * | 4/1999 | Haraguchi et al. .......... | 396/349 |
| 5,907,725 A | * | 5/1999 | Nomura et al. ............... | 396/87 |

* cited by examiner

Primary Examiner—Christopher E. Mahoney
(74) Attorney, Agent, or Firm—Finnegan, Henderson, Farabow, Garrett & Dunner, L.L.P.

(57) ABSTRACT

A camera includes: a lens barrel having a lens; a driving element for driving the lens barrel to move in a direction of an optical axis thereof; a finder of which magnification varies in accordance with a movement of the lens barrel driven by the driving element; a position sensor for detecting a position of the lens barrel; a controller for controlling the driving element so that the lens barrel driven by the driving element moves in the direction of the optical axis and stops at plurality of positions in the direction of the optical axis; and a memory for storing a plurality of position data with respect to the plurality of positions. The controller controls the driving element so that the lens barrel stops at the plurality of positions in the direction of the optical axis for magnification variation of the lens, according to results of detection by the position sensor and at least one of the plurality of position data stored in the memory.

6 Claims, 18 Drawing Sheets

FIG. 4 (a)
FIG. 4 (b)
FIG. 4 (c)
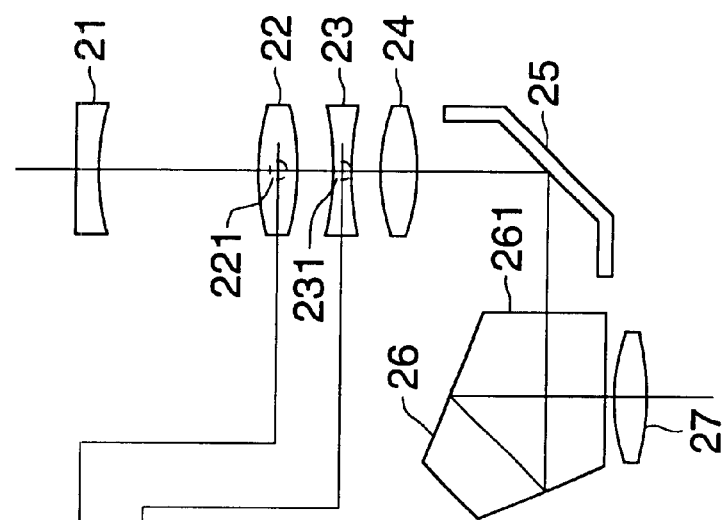
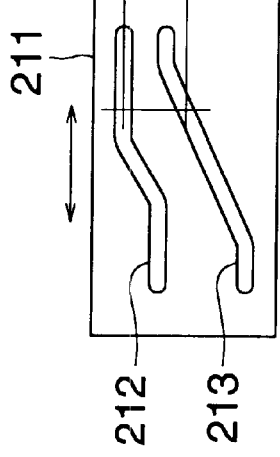
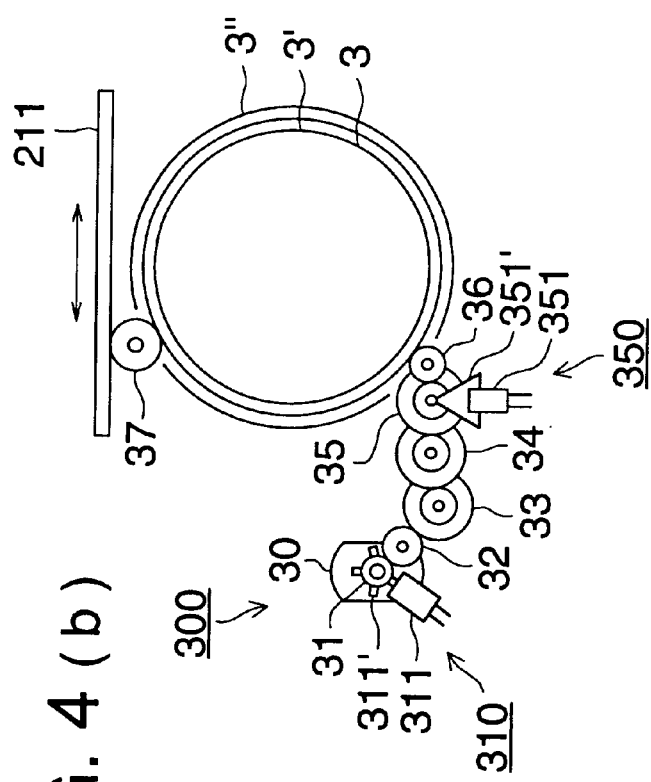

*2 : COUNT NUMBER OF PULSES CALCULATED PROTRUSION BY 2ND RELATIVE POSITION DETECTING MEANS

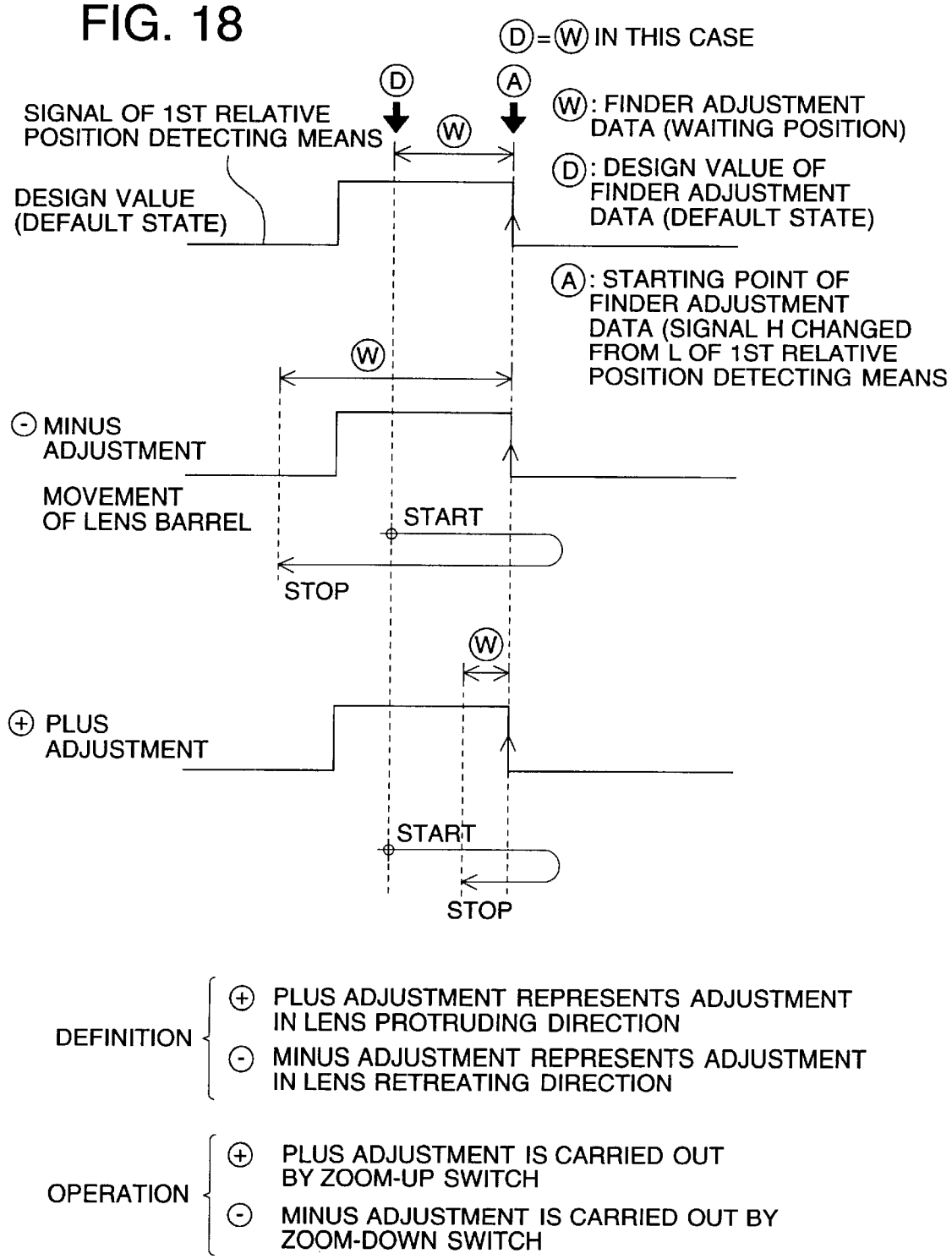

ZOOM CAMERA AND ADJUSTING METHOD FOR FIELD RATIO OF ZOOM FINDER OF ZOOM CAMERA

BACKGROUND OF THE INVENTION

The present invention relates to a camera equipped with a lens barrel having a camera lens and a finder which varies magnification based on a movement of the lens barrel in the optical axis direction, and to an adjusting method for the field ratio of a zoom finder of the camera.

In the field of a zoom camera, there has recently been available a zoom camera wherein plural zoom areas are provided, and a zoom button is operated to stop a zoom lens stepwise in the plural zoom areas to change a focal length of the zoom lens. By stopping stepwise in this manner, a zoom mechanism is simpler than that in a zoom camera wherein a lens barrel can be stopped continuously on a stepless basis, thus, a small-sized and inexpensive zoom camera can be achieved.

In general, in the zoom camera wherein a lens is stopped stepwise, when a zoom button is operated, a lens barrel having a camera lens stops at a waiting position corresponding to a prescribed zoom area in accordance with the operation of the zoom button, then, by conducting release operation for photographing, the lens barrel is protruded to the focal point position determined by a subject distance, so that photographing may be conducted.

On the other hand, a finder is a zoom finder whose magnification is varied based on a change of a focal length of the zoom lens, namely on a movement of the lens barrel, and when the lens barrel stops at the prescribed waiting position, the photographing area can be confirmed with a field ratio corresponding to the zoom area.

As stated above, even in the case of a zoom camera which stops stepwise, when a lens barrel stops at the waiting position of the prescribed zoom area, a finder needs to have an appropriate field ratio corresponding to the zoom area. However, even when a finder is set to the waiting position calculated for obtaining the prescribed field ratio of the finder in each zoom area, errors are caused by dispersion of parts and by dispersion of assembly, thus, improvement of accuracy of parts and improvement of assembly accuracy are required for obtaining an appropriated field ratio.

This equally applies to the mechanism wherein a lens barrel and a finder are mechanically joined, and the finder moves when the lens barrel is moved by one driving source, and to the mechanism wherein a movement of a lens barrel is detected, and a finder is driven by a driving source other than the lens barrel and by a driving mechanism, for example. The necessity for improvement of accuracy of parts and for improvement of assembly accuracy stated above has resulted in a cause of cost increase of a camera. Therefore, the novel structure of a zoom camera including a field ratio adjusting method for a zoom finder has been desired.

SUMMARY OF THE INVENTION

The invention has been achieved to solve the problems mentioned above. Namely, the first object is to provide a camera equipped with a finder which less affects the camera in terms of cost and has an appropriate field ratio in accordance with a change in a focal length of a zoom lens, and to provide a zoom finder field ratio adjusting method. Further, the second object is to provide a camera equipped with a finder which less affects, in terms of cost, a zoom camera wherein a lens stops stepwise at plural zoom areas and has an appropriate field ratio in accordance with a change in a focal length of a zoom lens, and to provide its zoom finder field ratio adjusting method.

The objects of the invention are attained by taking the following structures.

The objects stated above are attained by either one of the following structures.

Structure (1) A camera comprising lens barrel having a lens; a driving means which drives the lens barrel so that it moves in a direction of an optical axis of the lens; a finder of which magnification varies in accordance with a movement of the lens barrel driven by the driving means; a position sensor which detects the position of the lens barrel; a controller which controls the driving means so that the lens barrel driven by the driving means moves in the direction of the optical axis and stops at plural positions in the direction of the optical axis; and a memory which stores plural position data relating to the plural positions stated above, wherein the controller controls the driving means so that the lens barrel is capable of stopping at plural positions in the direction of the optical axis for magnification variation of the lens, based on results of detection by the position sensor and at least one of the plurality of position data stored in the memory.

Structure (2) The camera according to Structure (1), wherein the memory stores at least one of the position data for each of the plural positions.

Structure (3) The camera according to Structure (1), wherein the memory stores at least one of the position data being different from others.

Structure (4) The camera according to Structure (1), wherein the controller controls the driving means so that the lens barrel may stop stepwise at plural positions in the direction of the optical axis for the magnification variation of the lens.

Structure (5) The camera according to Structure (2), wherein the position sensor has an absolute position sensor which detects an absolute position of the lens barrel and a relative position sensor which detects a relative position of the lens barrel from the absolute position, and the controller controls the driving means in accordance with the results of detection by the absolute position sensor, the results of detection by the relative position sensor, and with the position data.

Structure (6) The camera according to Structure (2), wherein the controller selects the position data corresponding to the position of the lens from position data stored in the memory, and controls the driving means based on the selected position data.

Structure (7) The camera according to Structure (5), wherein the relative position sensor has a first relative position sensor and a second relative position sensor which detects relative positions of the lens barrel with the resolving power that is higher than that of the first relative position sensor.

Structure (8) The camera according to Structure (2), wherein the memory is EEPROM.

Structure (9) A camera finder field ratio adjusting method comprising a step to move a lens barrel having a lens in a direction of an optical axis, and to store in a memory the first information related to the first position representing the position of the lens barrel where the field ratio of a finder which varies in accordance with a movement of the lens barrel is a prescribed value, and a step to move the lens barrel in the direction of the optical axis, and to store in the memory the second information related to the second position representing the position of the lens barrel where the field ratio of the finder is a prescribed value, the second position is different from the first position, wherein the first position and the second position are those where the lens barrel stops after the magnification variation.

Structure (10) A finder field ratio adjusting method for a camera having a lens barrel which has a lens and moves in the direction of the optical axis to stop at plural zoom areas in the direction of the optical axis and having a finder which varies magnification in accordance with a movement of the lens barrel, wherein there are provided a step to move the lens barrel in the direction of the optical axis and thereby to store the first information related to the first position representing the position of the lens barrel where the field ratio of the finder is a prescribed value in the first area among plural zoom areas, and a step to move the lens barrel in the direction of the optical axis and thereby to store the second information related to the second position representing the position of the lens barrel where the field ratio of the finder is a prescribed value in the second area among plural zoom areas.

Structure (11) The method according to Structure (10), wherein the first position is a stop position for the lens barrel after magnification variation in the first area, and the second position is a stop position for the lens barrel after magnification variation in the second area.

Preferable structures are as follows.

Structure (12) A zoom camera having a lens barrel which has a zoom lens and stops stepwise at plural zoom areas and having a finder which varies magnification based on a movement of the lens barrel in the optical axis direction, comprising an operating means to operate the lens barrel, a driving means to drive the lens barrel, a position detecting means which detects position of the lens barrel, a control means which drives the lens barrel with the driving means in accordance with operations of the operating means and controls driving of the lens barrel so that the lens barrel may stop at each waiting position corresponding to each of the plural zoom areas, referring to the results of detection by the position detecting means, and a memory means which makes a waiting position of the lens barrel for at least one zoom area to be variable, and stores position data of the waiting position corresponding to the prescribed finder field ratio, wherein the control means controls the lens barrel to be at the waiting position based on position data stored in the memory means.

Structure (13) The zoom camera according to Structure (12), wherein the position detecting means has an absolute position detecting means which detects an absolute position of the lens barrel and a relative position detecting means which detects a relative position from the absolute position.

Structure (14) The zoom camera according to Structure (13), wherein the relative position detecting means has the first relative position detecting means and the second relative position detecting means which detects the relative position of the lens barrel under the resolving power which is higher than that in the first relative position detecting means.

Structure (15) The zoom camera according to either one of Structures (12)–(14), wherein all waiting positions of the plural zoom areas are variable, and the memory means stores position data of each waiting position corresponding to a prescribed field ratio for each of the plural zoom areas.

Structure (16) The zoom camera according to either one of Structures (12)–(15), wherein the memory means is EEPROM.

Structure (17) A zoom finder field ratio adjusting method for a zoom camera having therein a lens barrel which has a zoom lens and stops stepwise at plural zoom areas, an operating means to operate the lens barrel, a driving means to drive the lens barrel in the optical axis direction, a position detecting means to detect the position of the lens barrel in the optical axis direction, and a finder which varies magnification based on a movement of the lens barrel in the optical axis direction, wherein there is provided a control means which makes the driving means to drive a lens barrel in accordance with operations of the operating means, and controls the lens barrel so that it may stop at each waiting position corresponding to each of the plural zoom areas while referring to the results of detection by the position detecting means, while, a waiting position for the lens barrel for at least one zoom area is variable, and position data of the waiting position corresponding to the prescribed finder field ratio are stored in the memory means, and the control means controls the lens barrel to be at the waiting position corresponding position data stored in the memory means.

BRIEF DESCRIPTION OF THE DRAWINGS

Each of FIGS. 1(a) and 1(b) represents a schematic external view of a step zoom camera.

Figure 3A:
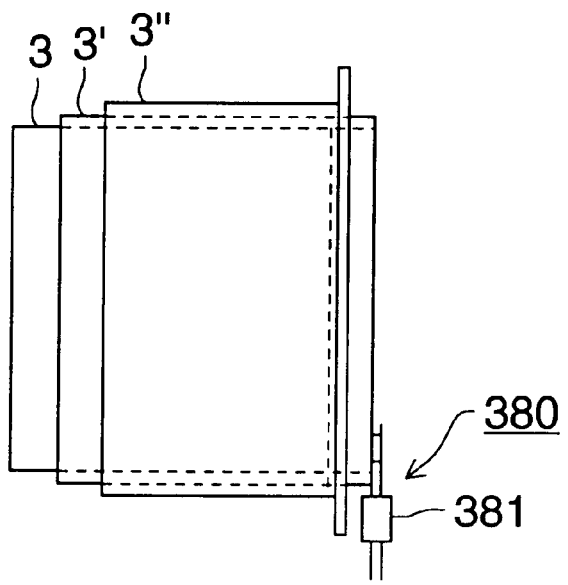
Figure 3B:
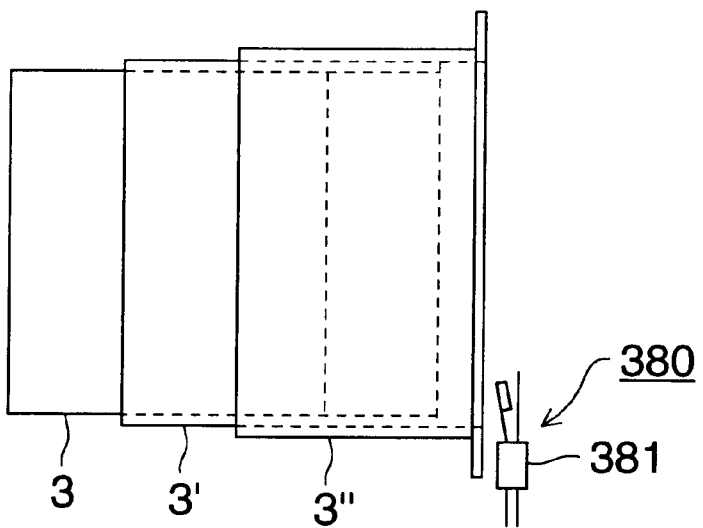

Each of FIGS. 3(a) and 3(b) is a diagram illustrating a detecting means which detects an absolute position of a lens barrel.

FIGS. 4(a), 4(b) and 4(c) represent diagrams illustrating operations of another lens barrel detecting means and zoom finder for the lens barrel of the present embodiment.

Figure 5:
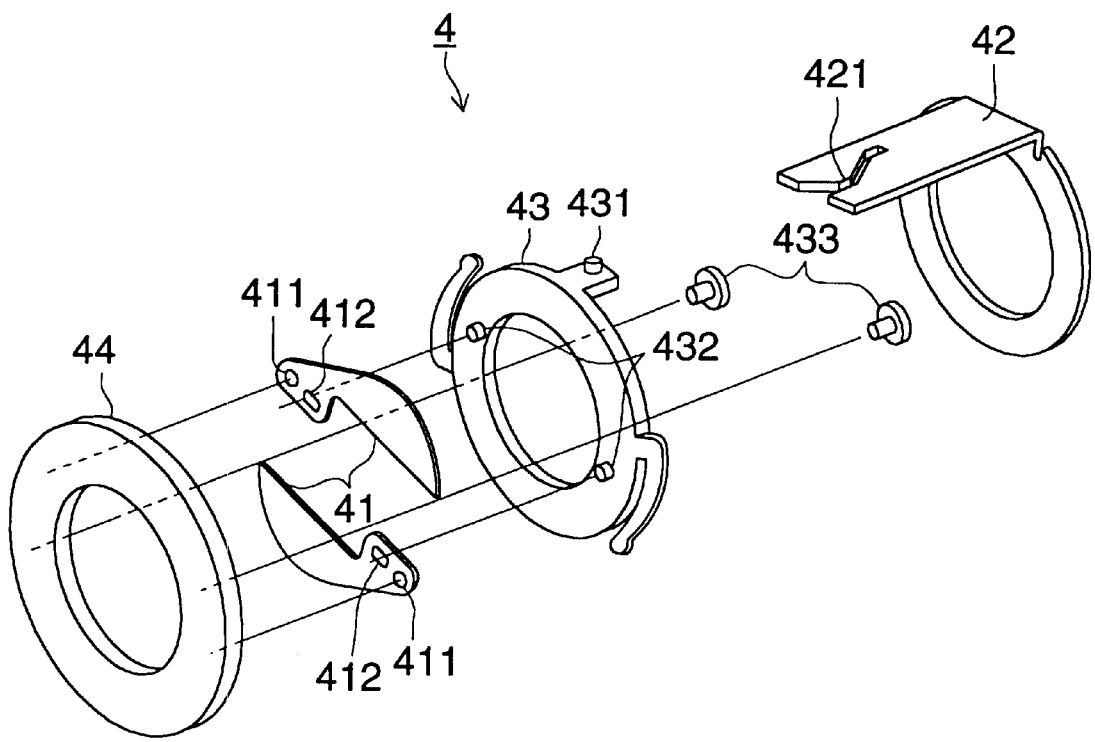

FIG. 5 is an exploded perspective view illustrating structures and operations of primary portions in a barrier mechanism which protects a camera lens.

Figure 6:
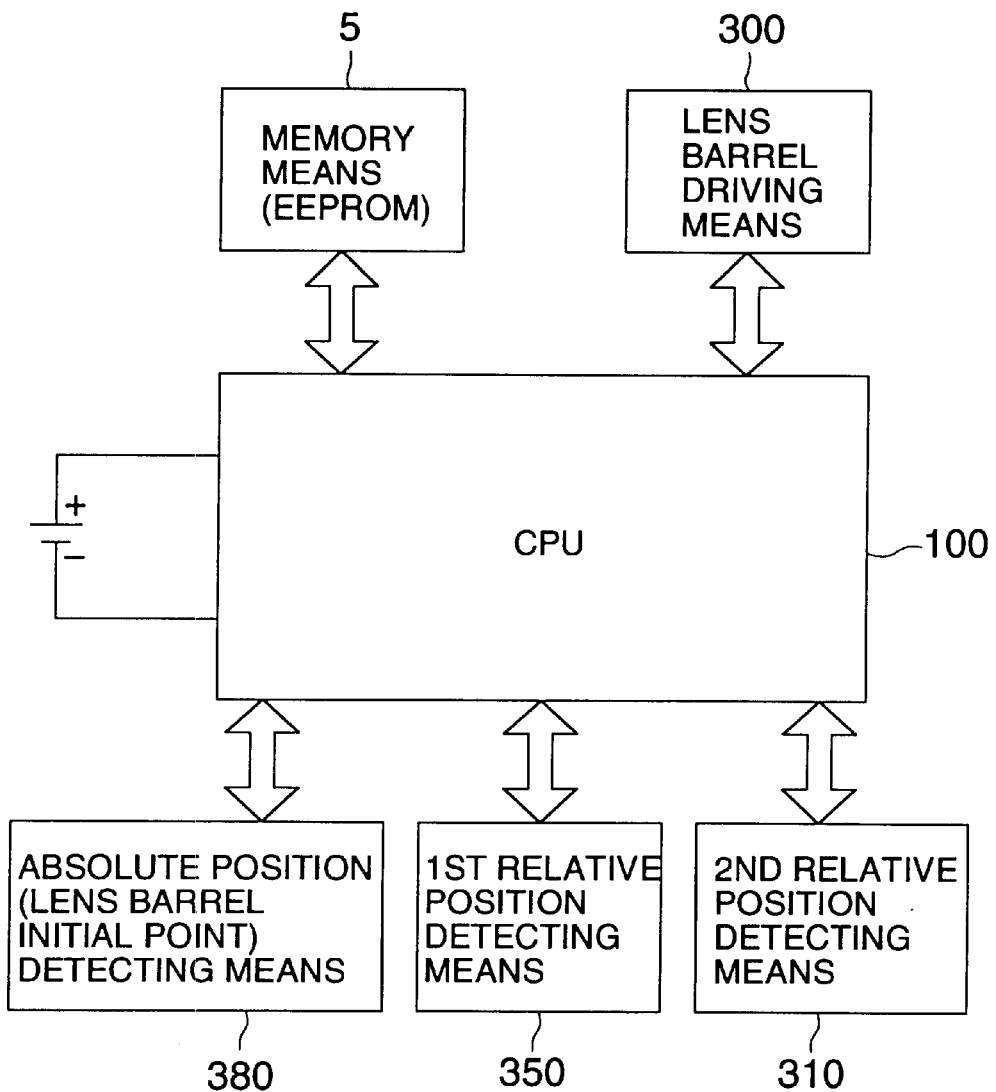

FIG. 6 is a block circuit diagram for each means processed and controlled by CPU.

Figure 7:
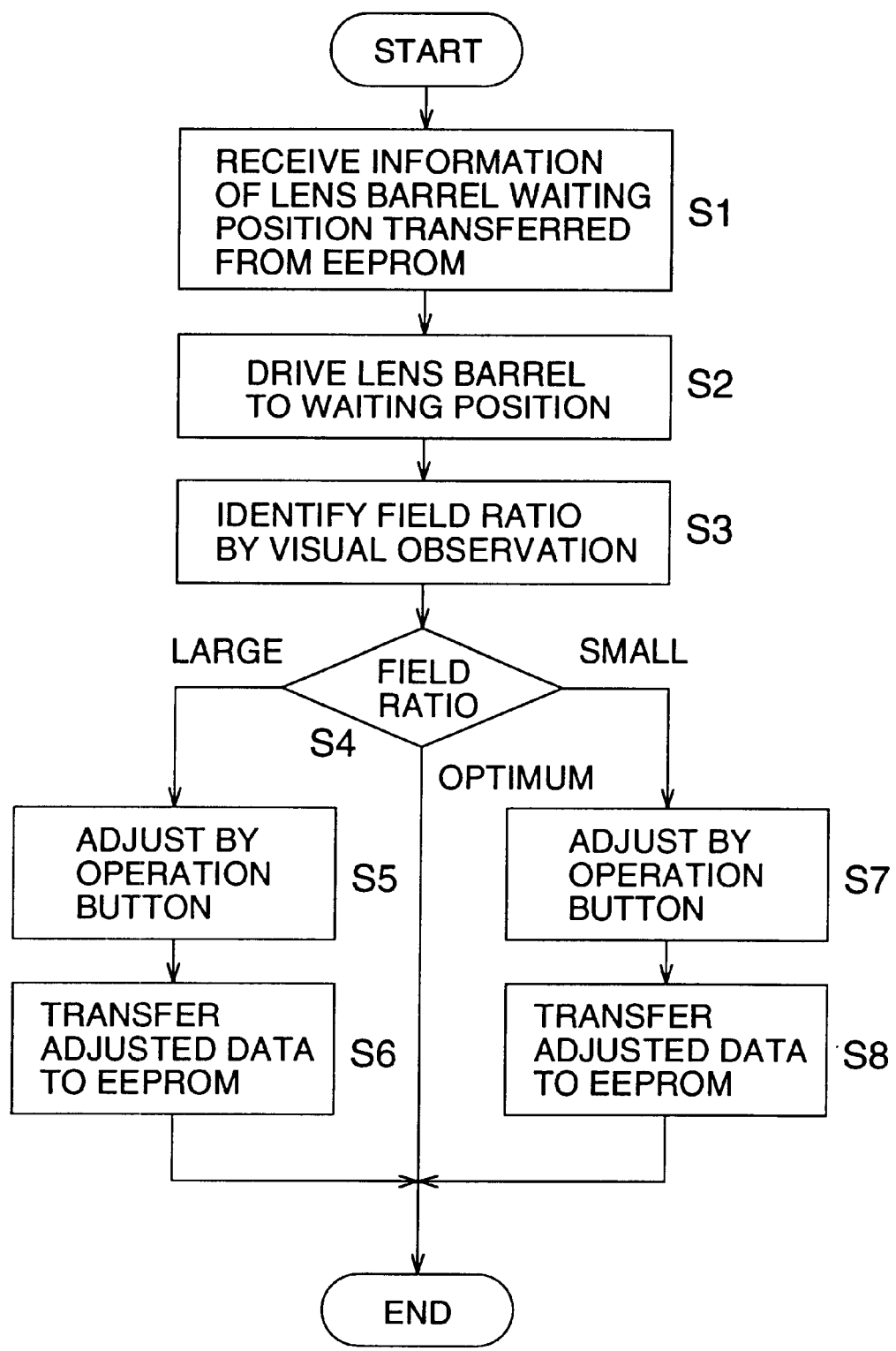

FIG. 7 is a flow chart for storing finder field ratio correction data in a memory means.

Figure 8:
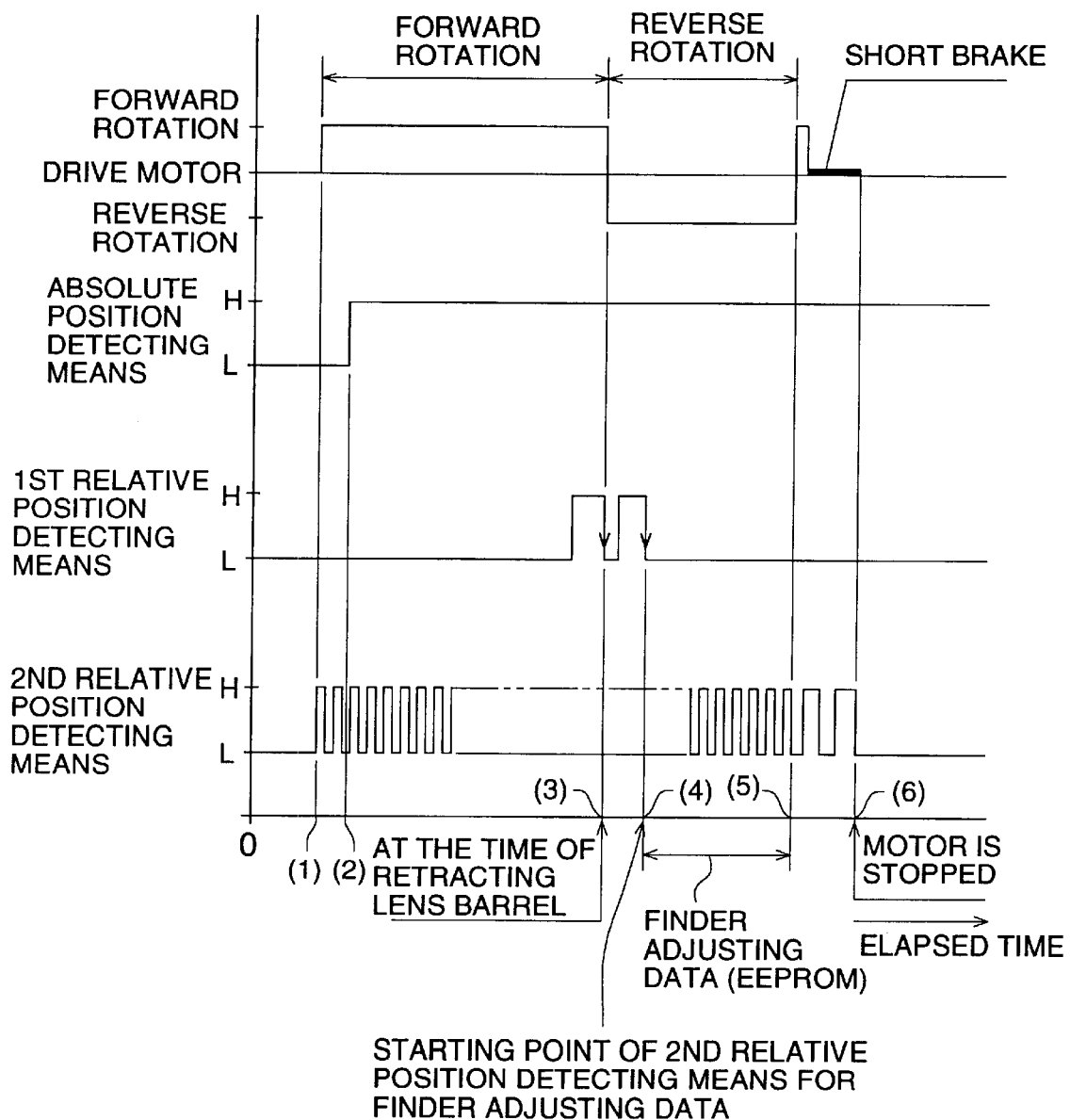

FIG. 8 is a diagram illustrating mutual relationship between rotation of a driving motor and each detecting means wherein an axis represents the time elapsed.

Figure 9:
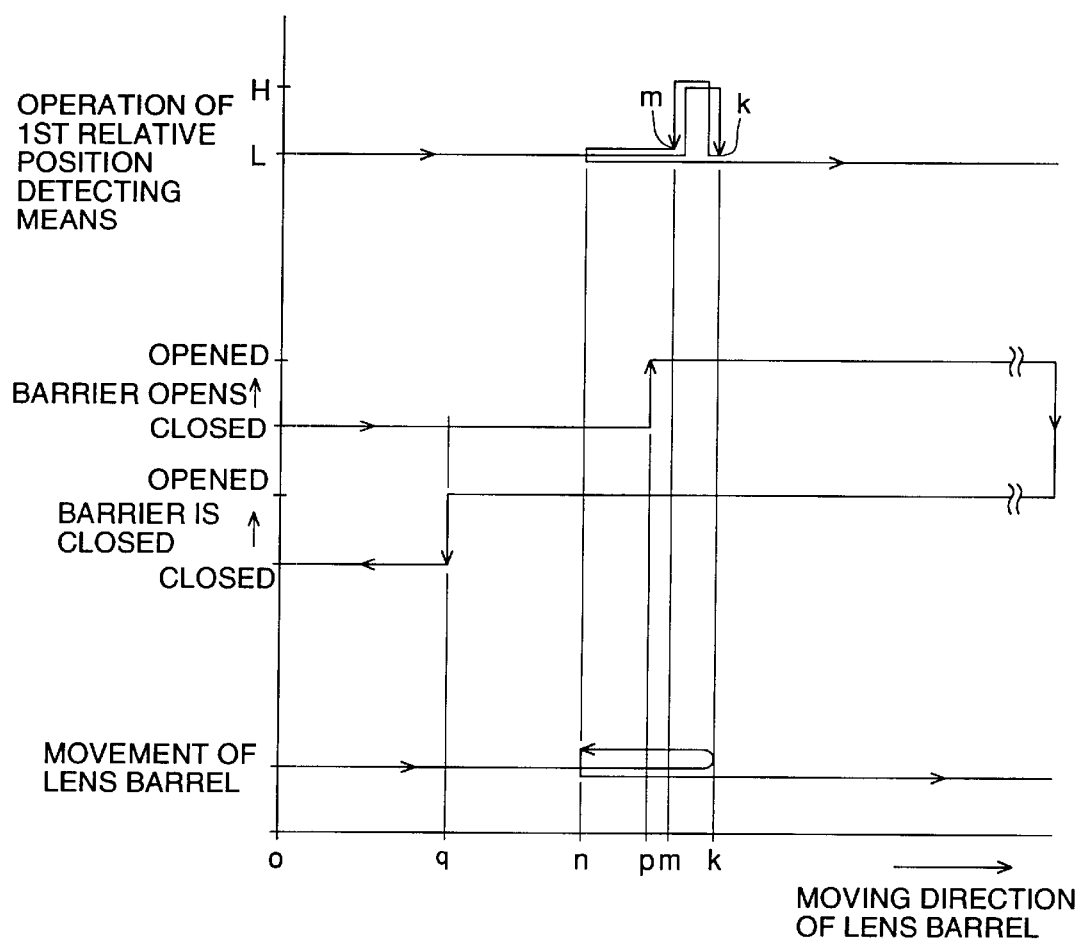

FIG. 9 is an illustration of mutual relationship between a detecting means and a barrier opening/closing mechanism wherein a movement of a lens barrel represents a reference axis.

Figure 10:
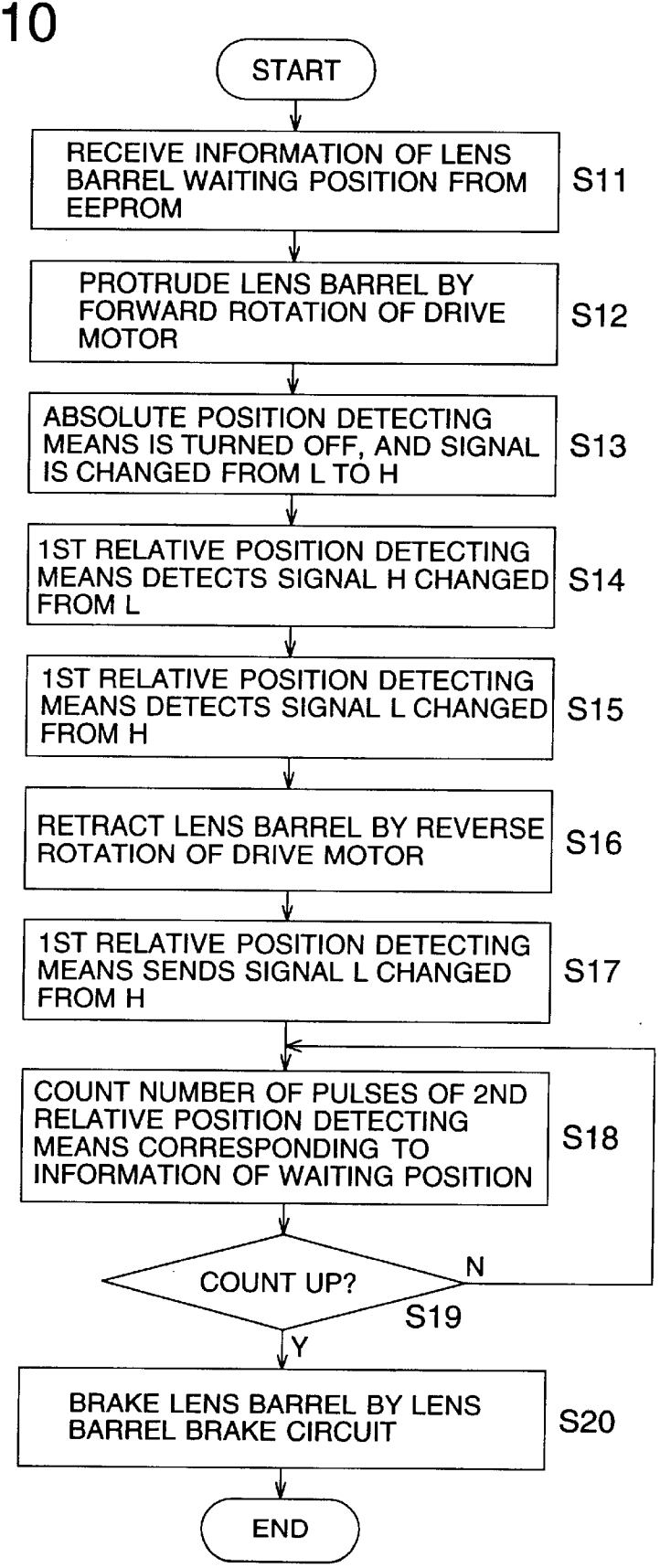

FIG. 10 is a flow chart illustrating correction control for a finder field ratio.

Figure 11:
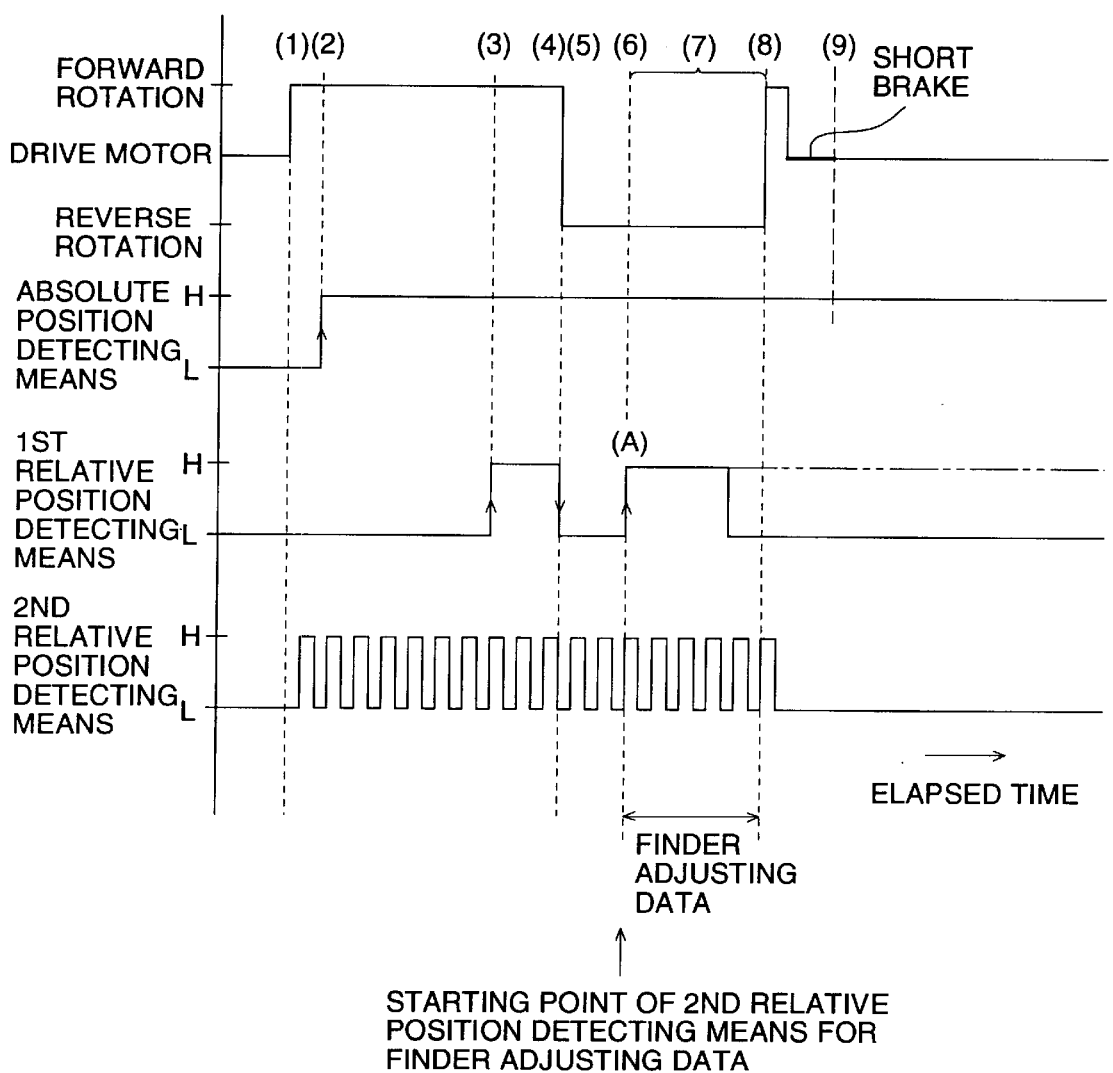

FIG. 11 is a diagram showing relationship between rotation of a driving motor and operations of an absolute position detecting means, the first relative position detecting means and of the second relative position detecting means.

Figure 12:
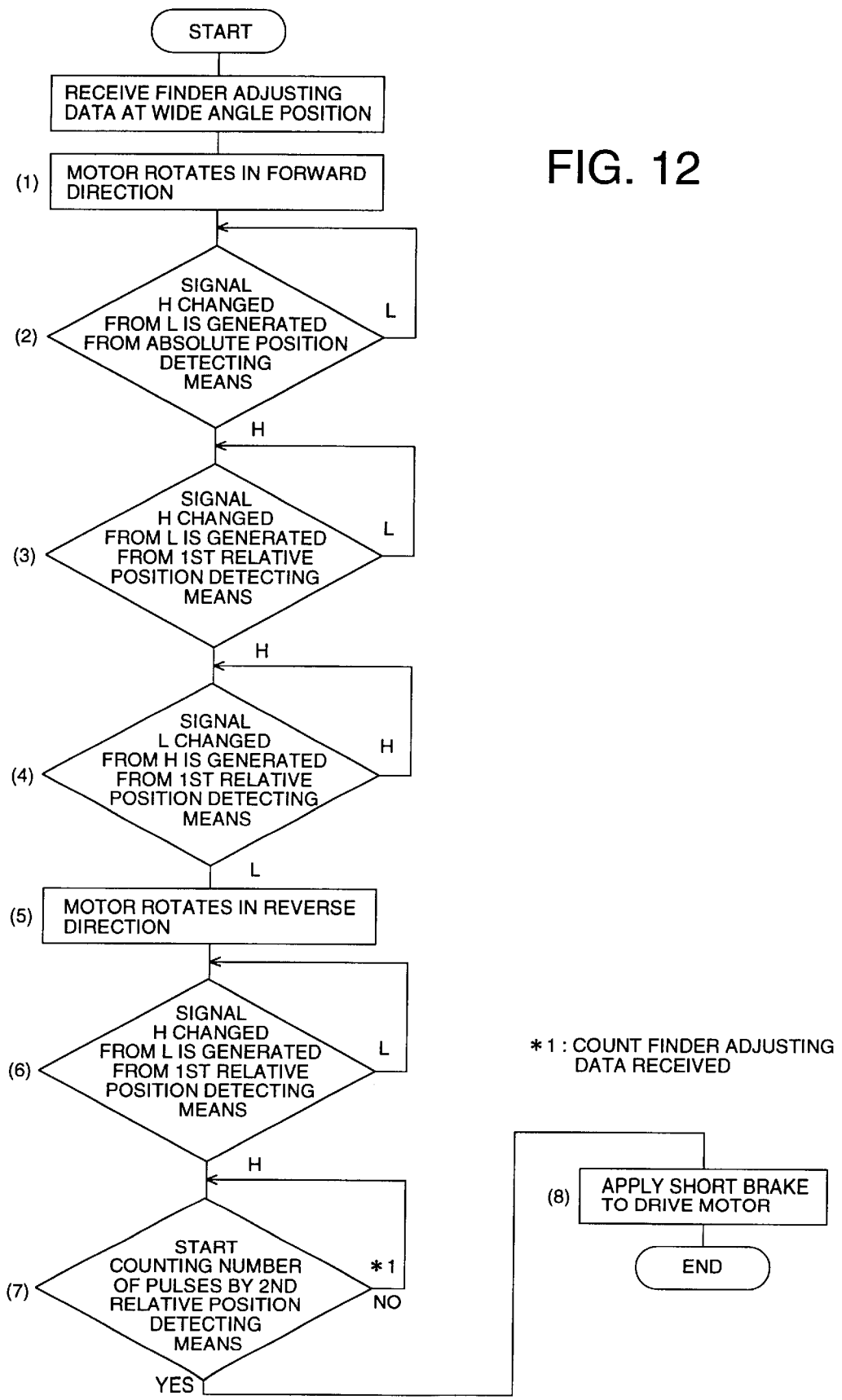

FIG. 12 is a flow chart illustrating operations in FIG. 11.

Figure 13:
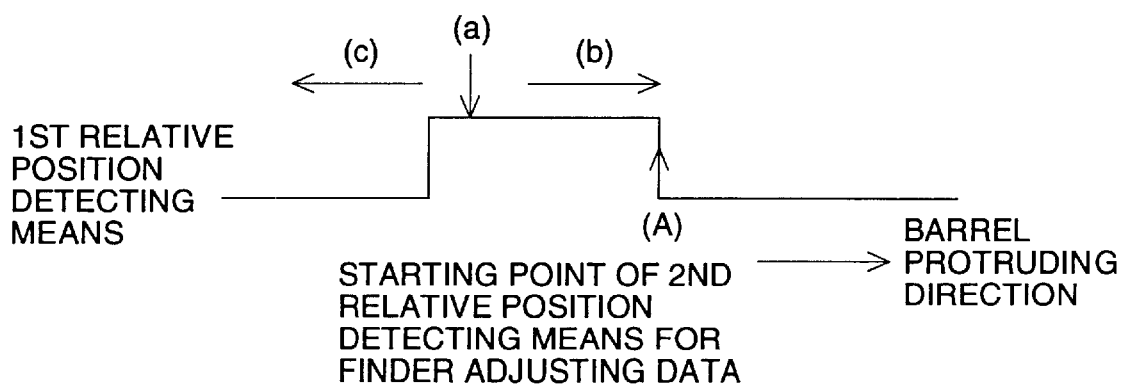

FIG. 13 is a diagram showing relationship between a waiting position of a lens barrel in each zoom area and a finder field ratio.

Figure 14:
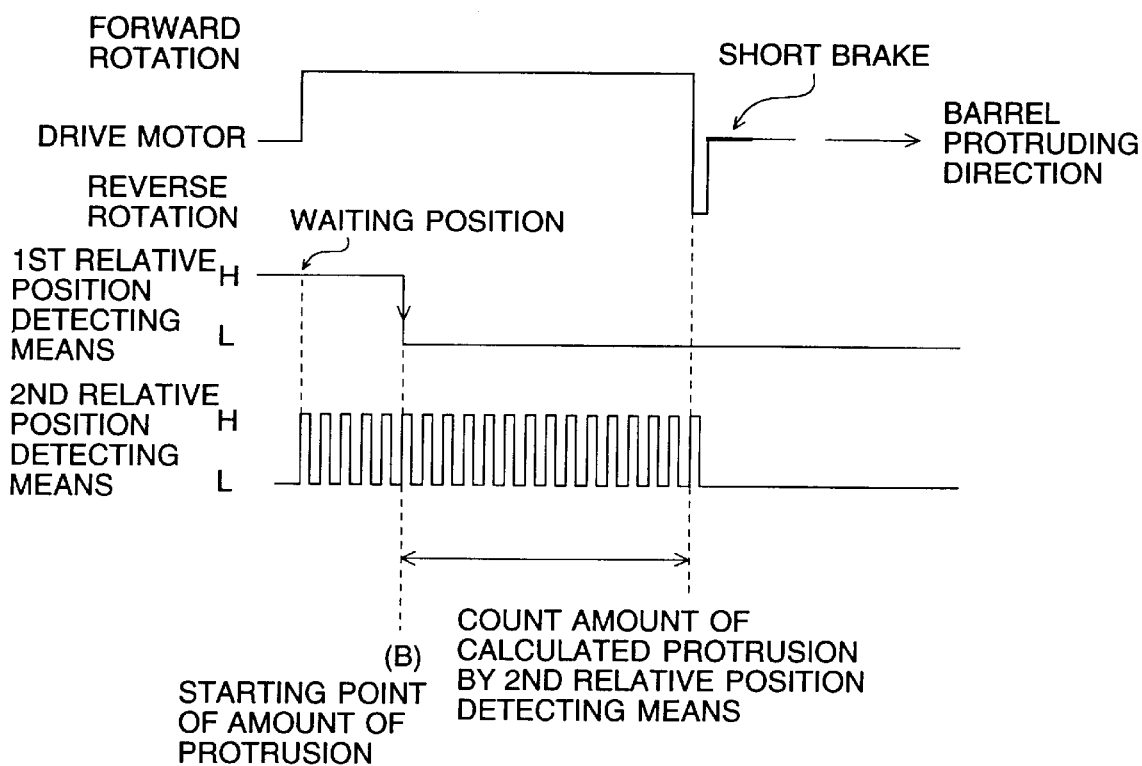

FIG. 14 is a diagram showing that focusing operations are conducted based on range finding data.

Figure 15:
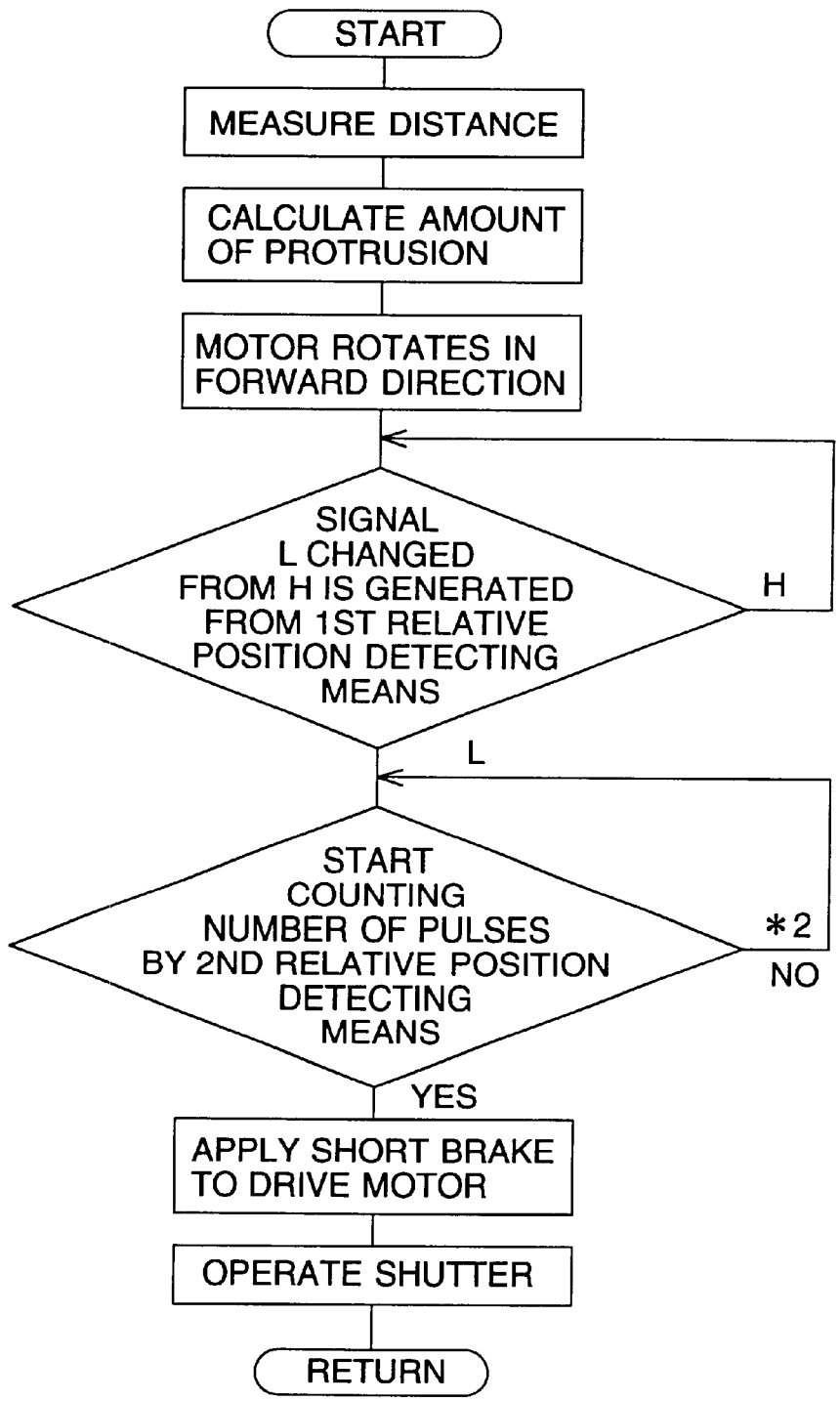

FIG. 15 is a flow chart wherein focusing operations are conducted based on range finding data.

Figure 16:
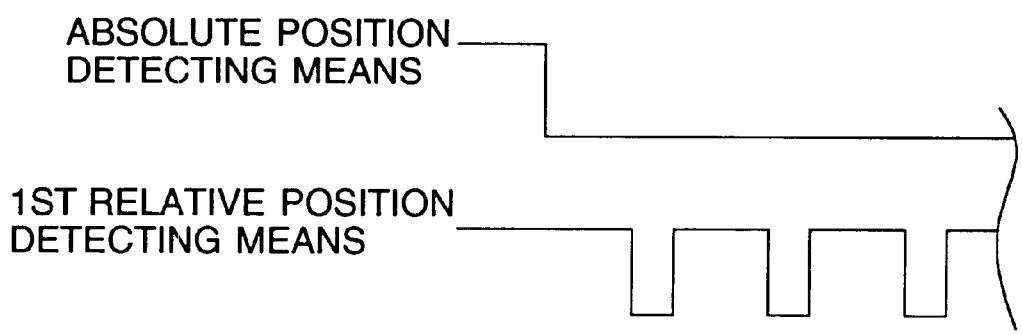

FIG. 16 is a diagram showing an example of deformation in FIG. 13 which shows relationship between a waiting position of a lens barrel and a finder field ratio.

Figure 17:
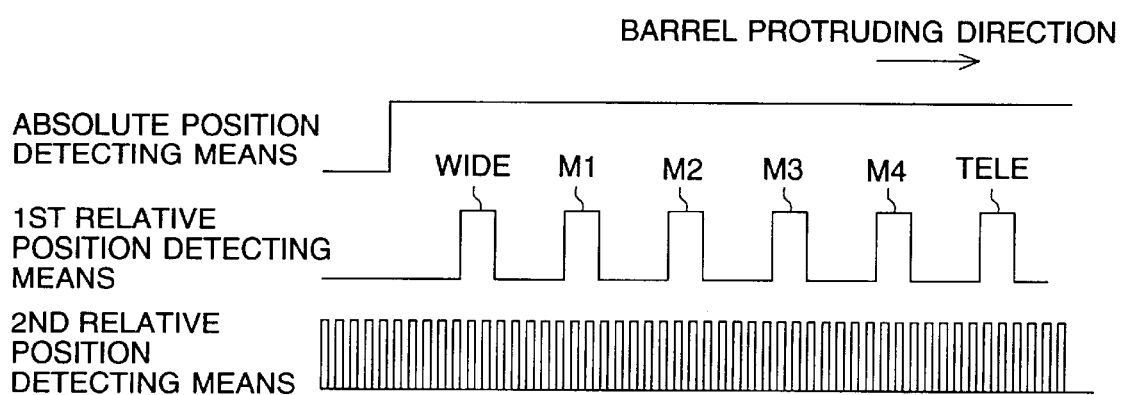

FIG. 17 is a diagram showing an occasion where a finder field ratio is corrected by a focal length other than that at a wide angle end.

FIG. 18 is an illustration of the occasion wherein a finder waiting position is adjusted.

DETAILED DESCRIPTION OF THE PREFERRED EMBODIMENT

Embodiment of the invention will be explained in detail as follows, referring to FIG. 1–FIG. 10, and the invention is not limited to the embodiment explained as follows.

Figure 1:
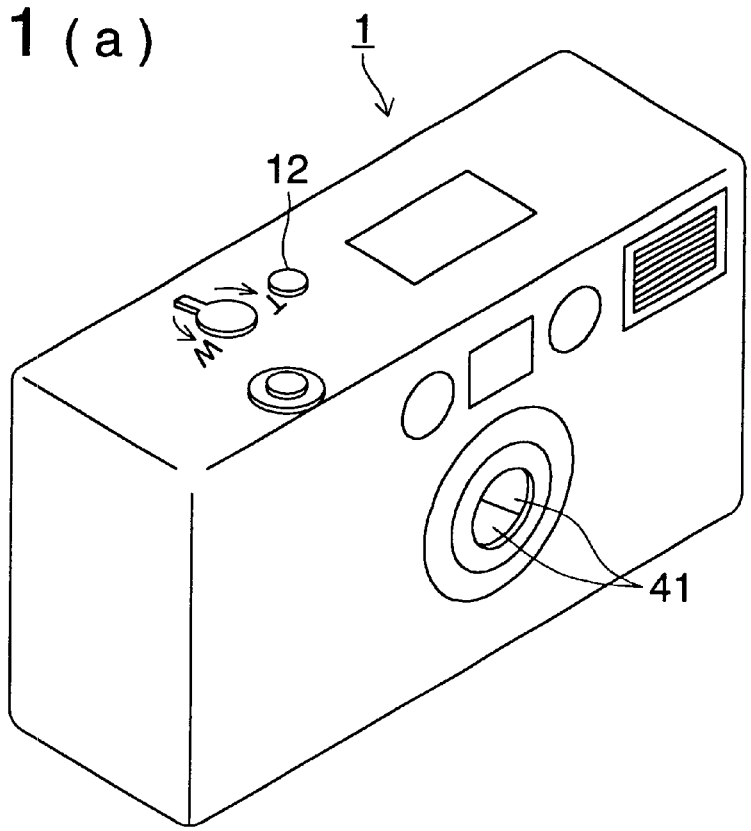
Figure 1:
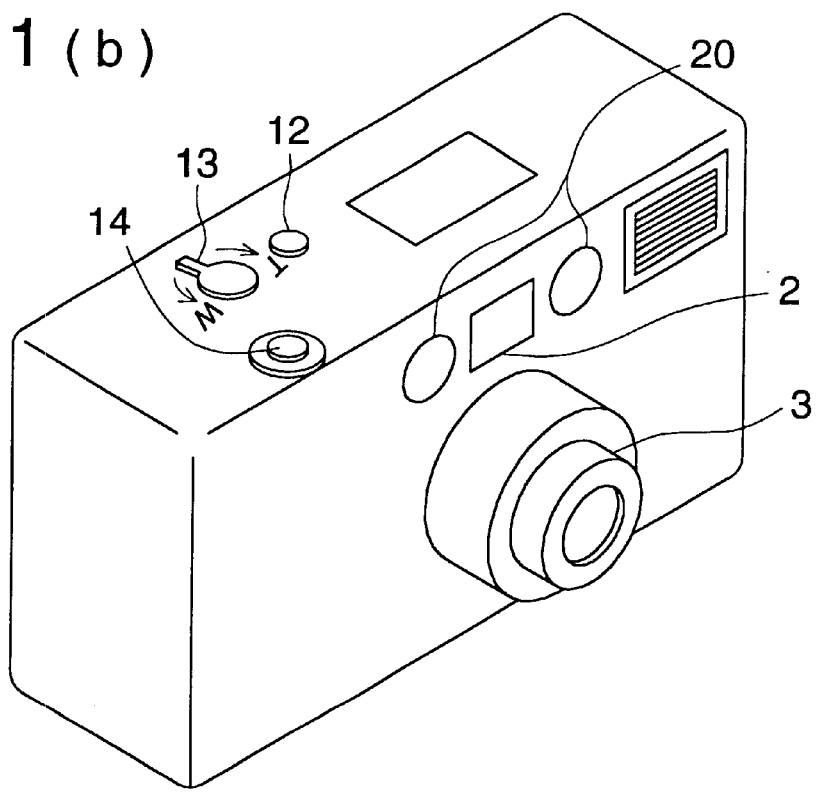
Figure 2A:
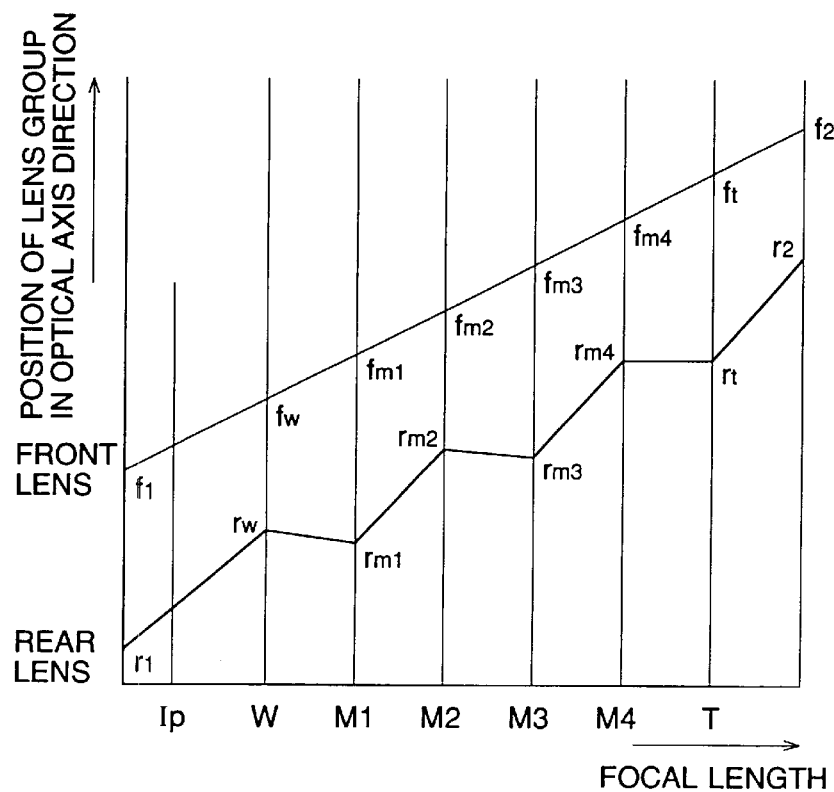
FIGS. 2(a) and 2(b) represent illustrations for zooming operations and focusing operations.
Figure 2B:
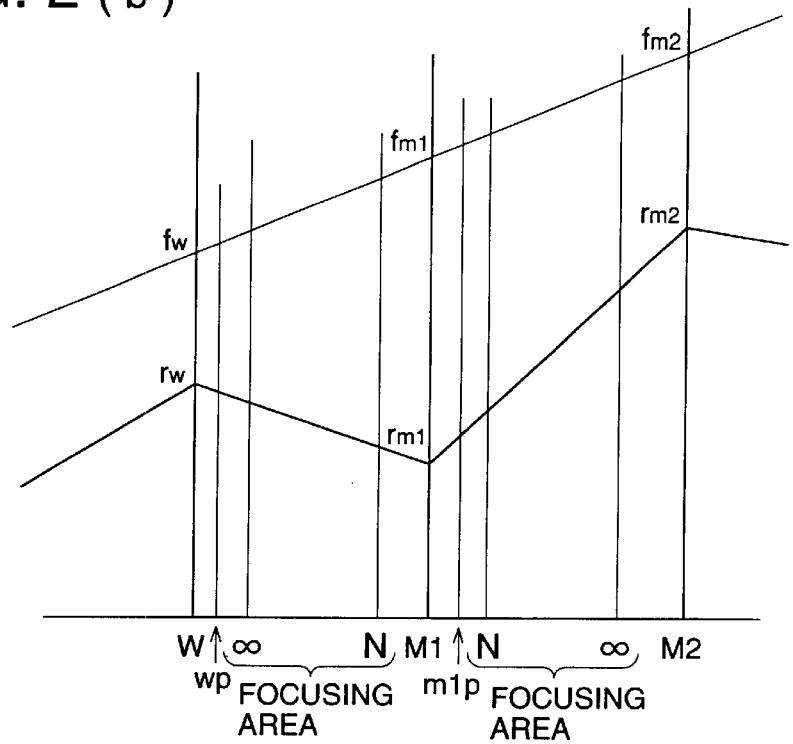

Each of FIGS. 1(a) and 1(b) represents a schematic external view of a camera equipped with a zoom lens which stops stepwise at plural zoom areas (hereinafter referred to as a step zoom camera), in which FIG. 1(a) is a diagram wherein a zoom lens is retreated, and FIG. 1(b) is a diagram wherein a zoom lens is under the wide angle focal length. FIGS. 2(a) and 2(b) represent diagrams illustrating relationship between zooming operations and focusing operations of a camera lens of a step zoom camera, and FIG. 2(b) is a partial enlarged diagram of FIG. 2(a). FIGS. 3(a) and 3(b) represent diagrams illustrating an absolute position detecting means which detects an absolute position of a lens barrel, in which FIG. 3(a) is a diagram wherein a microswitch is turned on, and FIG. 3(b) is a diagram wherein a microswitch is turned off. FIGS. 4(a), 4(b) and 4(c) represent diagrams illustrating operations of a zoom finder conducted by detection of a lens barrel at each position and by rotary driving of the lens barrel, in which FIG. 4(a) is a top view of a cam plate having a cam groove which moves a finder lens of a zoom finder, FIG. 4(b) is a front view illustrating a detecting means which drives the lens barrel and the cam plate and detects each position of the lens barrel, and FIG. 4(c) is a top view of a finder optical system. FIG. 5 is an exploded perspective view illustrating primary portions in a barrier mechanism which protects a camera lens.

When main switch button 12 is pressed for photographing in FIG. 1(a), lens barrel 3 is protruded and barrier 41 protecting a camera lens rotates to escape from the front of the lens and to unveil the camera lens, thus, step zoom camera 1 becomes ready for photographing as shown in FIG. 1(b). The numeral 13 is a zoom lever, and when the zoom lever is turned toward T, a zoom lens can be moved to the telephoto side, while, when the zoom lever is turned toward W, the zoom lens can be moved to the wide angle side. The numeral 14 is a release button, and 2 is a zoom finder to look through a subject to be photographed, and 20 is a range finding section to range find a subject for auto-focusing of the zoom lens. Under this state, when the main switch button 12 is pressed, lens barrel 3 is retreated, and barrier 41 rotates to cover the camera lens to return to the state in FIG. 1(a).

Now, relationship between zooming operations and focusing operations of a camera lens of a step zoom camera in the present embodiment will be explained first, referring to FIGS. 2(a) and 2(b).

In FIG. 2(a), the axis of abscissas represents a change of a focal length, in which W shows the shortest focal length, then the focal length becomes longer gradually at M1, M2 and M3, and T shows the longest focal length. In this way, the example in this diagram shows that the focal length can be switched to 6 steps in zooming, namely, that 6 zoom areas are provided.

The axis of ordinates shows the positions of the front lens and the rear lens of a zoom lens in the optical axis direction. Since the front lens is engaged with a rotating cam cylinder on a helicoid engagement basis, the front lens moves straight from $f_1$ to $f_w$, $f_{m1}$, ... $f_t$, and $f_2$ when the cam cylinder rotates. On the other hand, the rear lens is driven by a cam provided on the cam cylinder as a guiding section which moves the rear lens, and the cam is formed so that the rear lens may move from $r_1$ to $r_w$, $r_{m1}$, $r_{m2}$, ... $r_t$ and $r_2$, repeating a moving form in a chevron shape, between a focus position for an object distance of ∞, namely, of infinity and a focus position for the nearest distance.

FIG. 2(b) is an enlarged view covering from W to M2 in FIG. 2(a) for explaining a movement of a lens. The lens movement will further be explained referring to FIGS. 2(a) and 2(b).

When the main switch button 12 is pressed, the lens barrel is protruded, and the front lens and the rear lens start moving, respectively from $f_1$ to $f_w$ and from $r_1$ to $r_w$. At Ip point which is passed on a half way, microswitch 381 which will be described later is turned off, and this Ip point is an absolute position which is a reference position controlling the positions of a lens barrel thereafter. The lens further continues moving, then, passes $f_w$ and $r_w$ representing the starting point of first zoom area W, and stops at wp point. The wp point is a waiting position in the zoom area W.

Next, focusing operations will be explained. When release button 14 shown in FIGS. 1(a) and 1(b) is pressed under the condition that a lens is stopped at the waiting position wp point, the lens starts moving from the waiting position wp, and stops at the focus position corresponding to a subject distance of a focus area shown with ∞ and N in a zoom area, in accordance with subject distance information from an unillustrated range finding apparatus, then, photographing is conducted, and the lens returns to the waiting position wp point again and stops there.

Then, when zoom lever 13 shown in FIGS. 1(a) and 1(b) is operated to zoom by one step toward the telephoto side, a front lens and a rear lens move toward M1 and stops at m1p point which is a waiting position of zoom area M1.

In the same way as in the foregoing, the lens stops at a waiting position of each zoom area when the zoom lever is operated, and focusing is conducted at a focus area in each zoom area when a release button is operated.

The step zoom camera of the present embodiment is constituted so that zooming and focusing may be conducted by moving the front lens and the rear lens on the helicoid and cam provided on the same lens barrel, as stated above. Therefore, the same mechanism can be for both zooming and focusing, and one driving motor can take charge of both zooming and focusing.

Incidentally, zooming control for changing a focal length of a lens and focusing control for focusing on a subject are conducted by using the first relative position detecting means to detect a lens barrel position of a camera lens and the second relative position detecting means both described later, and details of them will be explained in a paragraph where the first and second relative position detecting means are described.

Next, in FIGS. 3(a) and 3(b), FIG. 3(a) shows absolute position detecting means 380 wherein microswitch 381 is turned on by being in contact with an end face of cam cylinder 3' located inside fixed lens barrel 3" which is mounted on a camera main body. FIG. 3(b) shows absolute position detecting means 380 wherein the cam cylinder 3' rotates and lens barrel 3 and the cam cylinder 3' move toward the left side and the microswitch 381 is turned off. When the microswitch is turned off, the position of the lens barrel at the moment when the microswitch is turned off, or, when the microswitch is turned on, the position of the lens barrel at the moment when the microswitch is turned on, is an absolute position of the lens barrel (lens barrel initial point), and this absolute position is a reference for all positions of the lens barrel thereafter.

Next, FIGS. 4(a), 4(b) and 4(c) will be explained. First finder lens 21 and last finder lens 24 out of finder lenses 21, 22, 23 and 24 in a finder optical system shown in FIG. 4(c) represent a fixed lens, and guide pin 221 for inner finder lens 22 engages with cam groove 212 on cam plate 211 to slide, and guide pin 231 for the next finder lens 23 engages with cam groove 213 to slide therein, thus, the finder lenses 22 and 23 move while changing their positions in the optical axis direction and changing their lens intervals to form a zoom finder, when the cam plate 211 moves in the arrowed direction. In the zoom finder, an image of the subject formed by the finder lenses 21, 22, 23 and 24 is reflected on mirror 25 to be deflected by 90° so that a real image may be formed on plane of incidence 261 of prism 26, and this real image is viewed by eye-piece 27.

On the other hand, due to the rotation of cam cylinder 3' caused by a driving means by which the driving power of driving motor 30 is transmitted by gear 31 attached on a shaft of driving motor 30 shown in FIG. 4(b) and a gear train engaging mutually with a series of gears 32, 33, 34, 35 and 36, the cam cylinder 3' and lens barrel 30 are moved straight in the optical axis direction, and zooming and focusing of a camera lens explained in FIGS. 2(a) and 2(b) are conducted. While, photointerrupter 351 combined with propeller 351' having one blade mounted on gear 35 forms first relative position detecting means 350 which can detect the relative position representing a distance from the absolute position (lens barrel initial point) of lens barrel 3 detected by the relative position detecting means explained in FIGS. 3(a) and 3(b).

Then, photointerrupter 311 combined with propeller 311' having plural blades mounted on a shaft of driving motor 30 forms second relative position detecting means 310 which can detect the relative position of the lens barrel with resolving power which is higher than that of the first relative position detecting means 350.

Incidentally, the rotation of cam cylinder 3' conducts zooming operations of the finder, interlocking with a zooming movement of a camera lens, by moving the cam plate 211 in the arrowed direction from side to side through gear 37. A series of these movement are driven by lens barrel driving means 300 having therein the driving motor 30, gear trains and an unillustrated motor driver.

Next, a mechanism of a barrier which protects a camera lens will be explained referring to FIG. 5.

In FIG. 5, pivot hole 411 on each of two barriers 41 is engaged with each of two unillustrated pivots studded on front ring 44, while, each of two barrier driving pins 432 studded on rotary ring 43 is inserted in each of driving pin holes 412 on two barriers 41, and the rotary ring 43 is provided rotatably on front ring 44 through two ring holders 433. Therefore, when the rotary ring 43 is rotated clockwise or counterclockwise, each of two barriers 41 rotates on pivot hole 411, and two barriers 41 are opened or closed.

On the other hand, rotating pin 431 is studded on an arm of rotary ring 43 as illustrated, and this rotating pin 431 is engaged with barrier cam 421 provided on straight advancement guide 42 which makes a lens barrel in which barrier 41 is incorporated to advance straight. Therefore, when the lens barrel is driven toward the front side (left side in the diagram) from the state where the rotating pin 431 is in the deepest position in the cam groove of barrier cam 421, the rotating pin 431 tends to come out of the cam groove on the barrier cam 421. Therefore, the rotating pin 431 is pushed by the barrier cam 421 and rotary ring 43 is rotated clockwise. Therefore, two barrier 41 rotate on pivot holes 411 respectively to be opened each other, and the barrier 41 is opened fully. Namely, when the lens barrel advances, the camera becomes ready for photographing.

When the lens barrel is retreated from the state wherein barrier 41 is fully opened, on the contrary, the rotating pin 431 is pushed by the cam groove on barrier cam 421 in the direction opposite to the foregoing, and rotary ring 43 is rotated counterclockwise to make two barriers 41 to be opened fully.

The mechanism of barriers which protect a camera lens operates in the aforesaid manner, and correction of finder field ratio which will be explained in detail later is controlled to be optimum under the condition that barriers are fully opened and a camera is ready for photographing.

Next, correction control to correct the field ratio of a finder of each camera in the camera assembly process will be explained, referring to FIG. 6–FIG. 10.

FIG. 6 is a block circuit diagram of each means which is processed and controlled by CPU (central processing unit). FIG. 7 is a flow chart illustrating how finder field ratio correction data are stored in a memory means. FIG. 8 is a diagram to explain the mutual relationship wherein the elapsed time for each of rotation of the driving motor, the absolute position detecting means by rotation of the driving motor, the first relative position detecting means, and the second relative position detecting means, represents an axis. FIG. 9 is a diagram to explain the mutual relationship wherein each of the first relative position detecting means, barrier opening, barrier closing and a movement of the lens barrel represents a reference axis. FIG. 10 is a flow chart explaining correction control for finder field ratio of the present embodiment.

In FIG. 6, CPU (central processing unit) 100 is made to be a central processing unit which conducts transmitting and receiving of signals with lens barrel absolute position (lens barrel initial point) detecting means 380 explained in FIGS. 3(a) and 3(b), first relative position detecting means 350 explained in FIG. 4, lens barrel position information of second relative position detecting means 310, lens barrel driving means 300 such as driving motor 30, a gear train, and a motor driver, and with memory means (EEPROM) 5 which will be explained in detail later, and conducts processing and control in accordance with a flow chart shown in FIG. 10 so that a camera may operate properly.

Next, in FIG. 7 where finder field ratio correction data are stored in memory means EEPROM capable of reading and writing conforming to each camera, lens barrel waiting position information such as design values stored in advance in S1 is transferred and received from EEPROM first, and the lens barrel is driven to the waiting position based on the lens barrel waiting position information in S2.

This lens barrel waiting position is one in the work of writing finder correction data in memory means EEPROM conforming to each camera, and in this work, a main switch button of a camera is pressed, and then, a lens barrel advances and stops at the prescribed position based on the design value in the vicinity of a focal length for W, and this stop position is the waiting position.

In S3 to stop at this waiting position, an operator looks through a finder and confirms the field ratio visually. If the field ratio is greater than the appropriate field ratio in S4, the operator operates an operation button (for example, zoom lever 13) in S5 to advance or retreat the lens barrel, and adjust the lens barrel position as shown in FIG. 18 so that the field ratio is appropriate. Then, adjustment data representing the position of the lens barrel adjusted for the appropriate field ratio are transferred to memory means EEPROM capable of reading and writing in S6 when release button 14 is pressed to the first step, for example, and the adjustment data are stored in EEPROM to be finished.

The field ratio (finder field ratio) in the present embodiment in this case is a ratio of an image range confirmed through a finder in the waiting position of the lens barrel in each zoom area to a range of photographed image at the prescribed focus position in the zoom area.

If the field ratio is smaller than the appropriate field ratio in S4, an operator makes adjustment so that the field ratio may become appropriate by operating the operation button to advance or retreat the lens barrel in S7, in the same way as in the case where the field ratio is greater. Then, the adjustment data are transferred to EEPROM capable of reading and writing in S8, thus, the adjustment data are stored to be finished. If the field ratio is appropriate in S4, the work is finished there to enter the field ratio correction for the next camera. In any way, an operator confirms whether the field ratio is appropriate or not by looking through a finder, and if it is appropriate, nothing is done, but when it is not appropriate, the operator makes adjustment so that it may become appropriate. The appropriate adjustment data are stored in EEPROM to be corrected, and these stored and corrected data are used as lens barrel waiting position information for finder correction in operations for photographing by a user in a flow chart in FIG. 10 which will be described later.

Next, FIG. 11 represents mutual relationship of operations wherein the elapsed time for each of rotation of a driving motor, an absolute position detecting means by rotation of the driving motor, the first relative position detecting means and the second relative position detecting means represents an axis. FIG. 11 shows the state wherein the main switch button of a camera is pressed, then, the lens barrel advances, barriers protecting a lens open, a focal length of a zoom lens is set to W of the first focus distance position, and the field ratio of the finder is set to be appropriate. FIG. 12 is a flow chart illustrating operations in FIG. 11. Incidentally, each of (1)–(9) in FIG. 11 agrees with the step number in FIG. 12.

In FIG. 11, when the power supply is turned on and a driving motor rotates regularly, the lens barrel starts advancing, and pulse signals by L, H, L and H of the second relative position detecting means are generated immediately. Then, in succession, signals from L to H by the absolute position detecting means are generated in (2). Next, in step (3), signals from L to H are generated by the first relative position detecting means, and when signals from H to L for the fall are generated in step (4), the signals make the driving motor to rotate reversely, which makes the lens barrel to start retracting (5).

Next, when signals from L to H are generated by the first relative position detecting means in step (6), CPU 100 reads finder field ratio adjustment data relating to the waiting position of the lens barrel in zoom area W from memory means EEPROM, and starts counting the pulse number by the second relative position detecting means (6), (7). Then, when this count number agrees with the finder field ratio adjustment data in step (8) to be counted up, short brake is applied on the driving motor, and the driving motor stops in step (9).

FIG. 13 shows relationship between the waiting position of the lens barrel in each zoom area and the finder field ratio, and point (A) in the diagram indicates point (A) in FIG. 11. Point (a) indicates the position where the lens barrel is stopped when confirming the field ratio by looking through the finder in the case of preparing the finder field ratio adjustment data. Namely, it represents design references for the waiting position of the lens barrel in each zoom area in the course of design of a camera.

There will be explained the position for the lens barrel to stop when it is moved to the waiting position based on the finder field ratio adjustment data prepared when the finder field ratio is judged to be greater than an appropriate value in S4 in FIG. 7. With regard to the lens barrel, when the first relative position detecting means counts the number of pulses generated by the second relative position detecting means in step (6) ((A)) in FIG. 11 by using signals from L to H as a trigger, if the counted number agrees with the finder field ratio adjustment data ((*b*)), the lens barrel is stopped. In this case, the lens barrel stops at the position which is closer to T in the optical axis direction than point (a) representing the design reference, because the finder field ratio data are smaller in terms of value than the design reference value.

There will be explained the position for the lens barrel to stop when it is moved to the waiting position based on the finder field ratio adjustment data prepared when the finder field ratio is judged to be smaller than an appropriate value in S4 in FIG. 7. With regard to the lens barrel, when the first relative position detecting means counts the number of pulses generated by the second relative position detecting means in step (6) ((A)) in FIG. 11 by using signals from L to H as a trigger, if the counted number agrees with the finder field ratio adjustment data ((c)), the lens barrel is stopped. In this case, the lens barrel stops at the position which is closer to the retracted lens barrel side in the optical axis direction than point (a) representing the design reference, because the finder field ratio data are greater in terms of value than the design reference value.

Next, there will be explained an occasion wherein photographing is conducted after selection of a focal length in a camera in which finder field ratio adjustment data are stored.

FIGS. 14 and 15 show a concept of the occasion wherein range finding is conducted by a range finding means by pressing of a release button to the first step (S1 switch is turned ON) after selection of a focal length, and focusing operation is conducted based on the range finding data.

When the release button is pressed to the first step (S1 switch is turned ON) under the condition that the lens barrel is stopped at the waiting position, a subject distance is measured by a range finding means, and range finding data corresponding to the subject distance are calculated. Then, the motor starts rotating in the regular direction, and the second relative position detecting means generates pulse signals. Then, when signals from L to H are generated by the first relative position detecting means ((B)), counting of the number of pulses generated by the second relative position detecting means is started. When the number of pulses generated by the second relative position detecting means agrees with an amount of protruding obtained based on range finding data, CPU 100 controls so that a brake may be applied on the motor, and when the motor is stopped, the shutter operates for photographing. Namely, even when the waiting position of the lens barrel is either one of (a)–(c) in FIG. 13, focusing control is conducted by using signals from H to L generated by the first relative position detecting means as a trigger. Therefore, highly accurate focusing can be conducted in the simple structure.

Incidentally, the relationship between H and L of signals generated by the absolute position detecting means, the first relative position detecting means and the second relative position detecting means can be designed freely with circuit structure, and the relationship opposite to that in FIG. 13 is also acceptable as shown in FIG. 16.

Next, another embodiment will be explained. Incidentally, in the present embodiment, only portions which are different from those in the previous embodiment will be explained.

Next, FIG. 8 is a diagram illustrating the mutual relationship of operations wherein the elapsed time for each of rotation of the driving motor, the absolute position detecting means by the rotation of the driving motor, the first relative position detecting means and the second relative position detecting means represents an axis. Together with FIG. 9 which will further be explained next, the diagram above shows the process wherein the main switch button of the camera is pressed, then the lens barrel advances to open barriers which protect the lens, and then, a focal length of the zoom lens is set to the position W for the aforesaid first focal length, and the field ratio of the finder is set to be appropriate. Incidentally, FIGS. 8 and 9 represent an example wherein the field ratio before adjustment is smaller than the appropriate value, and adjustment data which make the field ratio to be appropriate through the aforesaid field ratio adjustment are stored in EEPROM.

In FIG. 8, when the power supply is turned on and the driving motor rotates regularly, the lens barrel starts protruding, and immediately, pulse signals by L, H, L, H are generated by the second relative position detecting means from (1). Then, at (2), signals from L to H by the absolute position detecting means are generated. Next, when signals from H to L for the fall by the first relative position detecting means are generated at (3), the driving motor is made to rotate reversely by these signals, and the lens barrel starts retracting.

Next, at (4) where signals from H to L are generated by the first relative position detecting means, counting of the number of pulses by the second relative position detecting means is started by information of the finder field ratio adjustment data from memory means EEPROM explained in FIG. 7, and when this counted number agrees with adjustment data to be counted up at (5), short brake is applied on the driving motor, and driving motor stops at (6). Due to this, the lens barrel is moved to the waiting position of zoom area W in FIG. 2.

Now, the operations in FIG. 8 will be explained with a movement of the lens barrel, referring to FIG. 9.

In FIG. 9, the driving motor rotates regularly and the lens barrel moves toward the right side from 0 position, and when it comes to position k, the first relative position detecting means generates signals from H to L. This position k is a position of (3) in FIG. 8. Position m where the driving motor rotates reversely, and thereby the lens barrel starts retracting, and the first relative position detecting means generates signals from H to L again is a position of (4) in FIG. 8. The number of pulses by the second relative position detecting means is counted from the position m, by information of finder adjustment data from memory means EEPROM, until the number of pulses agrees with the adjustment data. When it is counted up, the driving motor stops, and this stop position is a point is retracting position n of the lens barrel. Then, due to the aforesaid retracting of the lens barrel, the finder field ratio is corrected to the appropriate field ratio by the adjustment data adjusted by an operation button at S5 and S7 explained in FIG. 7.

The finder is naturally subjected to adjustment, each time a camera becomes ready for photographing after a main switch button of the camera is pressed based on the corrected (adjusted) value, and a lens is set to the position of first wide angle end W of a zoom lens. Incidentally, the position k where the driving motor rotates reversely is a position located beyond position p where barriers change from close to open, and even when the driving motor rotates reversely and the lens barrel returns to position n, the aforesaid position is not returned to position q where barriers change from open to close, thus, the barriers are still opened. Namely, the barriers are opened to be ready for photographing, and under that state, the field ratio of the finder is corrected properly.

Next, with regard to explanation of FIG. 10, this will be made by putting it in order, though some of them have already been described in FIGS. 8 and 9.

When a main switch button of a camera is pressed by a user, the camera receives the aforesaid finder field ratio adjustment data of lens barrel waiting position information from EEPROM, in S11. Then, in S12, the driving motor rotates regularly to protrude the lens barrel. Then, in S13, the absolute position detecting means is turned off, and signals from L to H are generated. With this absolute position detecting means turned off, signals from L to H of the first relative position detecting means are detected in S14 so that the zooming position where a camera lens is set may be recognized. It is represented by W in the present embodiment. After that, in S15, signals from H to L of the first relative position detecting means for the reverse rotation of the driving motor are detected in S15.

Then, in S16, the driving motor rotates reversely to start retraction of the lens barrel. Further, in S17, when the first relative position detecting means generates next signals from H to L, the number of pulses of the second relative position detecting means are counted in S18 until it agrees with finder field ratio adjustment data equivalent to waiting position information. When counted up in S19, a brake is applied on a lens barrel brake circuit in S20, and the driving motor stops, and lens barrel stops at that position. Thus, the state of being ready for photographing of a zoom lens for photographing at position W is finished.

Since the step zoom camera of the present embodiment is structured as stated above, it has become possible to keep the appropriate field ratio of the finder constantly at no cost. Namely, with regard to the maintenance of the finder field ratio, parts which are relatively low in terms of accuracy and are low in terms of cost are used without using highly accurate parts, and adjustment data for appropriate field ratio are stored in memory means EEPROM so that various errors of parts may be absorbed in the final assembly step, then the lens barrel is set by reading the adjustment data from EEPROM, and the finder field ratio is corrected to be appropriate. Therefore, it is possible to provide an inexpensive step zoom camera to users.

Incidentally, in the embodiment above, though the correction of the finder field ratio is conducted only with a focal length of a zoom lens which is at W (wide angle end) in the explanation, a focal length of the zoom lens can also be M1, M2, . . . , T shown in FIG. 17. Pulse signals of the first relative position detecting means are generated once in one turn of the first relative position detecting means 350.

Though the movement of the lens barrel having a camera lens is connected mechanically with the movement of the finder lens in the zoom camera of the embodiment above, the invention is not limited to the foregoing, and it may be the following one.

a: A camera wherein each of a lens barrel having a camera lens and a finder has its own driving source and driving mechanism, and a finder lens is driven to be controlled by position data of the lens barrel.

b: A camera wherein a finder lens does not move, and a size of the field frame of the finder is changed so that a field range may be enlarged or reduced to change magnification, and enlargement and reduction of the field frame are controlled by position data of the lens barrel.

c: A camera wherein a finder is structured with a liquid crystal which displays a field image taken by CCD elements, and the field image displayed with a liquid crystal is enlarged or reduced by position data of the lens barrel.

Namely what is required is a finder which changes magnification based on a movement of a lens barrel having a camera lens.

The invention makes it possible to provide a zoom camera having a zoom finder which has less influence in terms of cost on the zoom camera and has an appropriate field ratio in accordance with a change of a focal length of the zoom camera, and a method of adjusting a zoom finder field ratio.

What is claimed is:

1. A zoom lens camera comprising:
   a lens barrel having an optical axis and a lens that stops stepwise at a plurality of zoom areas;
   driving means for moving the lens barrel in a direction of the optical axis;
   a finder having magnification that varies in accordance with movement of the lens barrel by the driving means in the direction of the optical axis;
   a position detector for detecting the position of the lens barrel in the direction of the optical axis;
   a controller for controlling the driving means to drive the lens barrel so that the lens barrel stops at each of a plurality of waiting positions corresponding respectively to each of the plurality of zoom areas in dependence on a detected result by the position detector; and
   a memory for making a waiting position of the lens barrel for at least one zoom area variable, and for storing position data of the waiting position corresponding to a predetermined finder field ratio representing a ratio of an image range confirmed through the finder in the waiting position of the lens barrel in each zoom area to a range of photographed image at a prescribed focus position in the zoom area,
   wherein the controller controls the driving means so that the lens barrel moves to the waiting position based on the position data stored in the memory.

2. The zoom camera of claim 1, further comprising an operating means for operating the lens barrel.

3. The zoom camera of claim 1, wherein the position detector comprises a first position detecting means and a second position detecting means that detects the position of the lens barrel under resolving power that is higher than that of the first position detecting means.

4. The zoom camera of claim 1, wherein all waiting positions of the plurality of zoom areas are variable, and the memory stores position data of each waiting position corresponding to a predetermined field ratio for each of the plurality of zoom areas.

5. The zoom camera of claim 1, wherein the memory is EEPROM.

6. A-zoom finder field ratio adjusting method for a zoom camera having a lens barrel that has a zoom lens and stops stepwise at a plurality of zoom areas, a driving means to drive the lens barrel in an optical axis direction, a position detector to detect a position of the lens barrel in the optical axis direction, and a finder which varies magnification based on movement of the lens barrel in the optical axis direction, the method comprising:

(a) driving the lens barrel so that the lens barrel stops at each waiting position corresponding to each of the plurality of zoom areas based on the detected results by the position detector, thus a waiting position for the lens barrel for at least one zoom area being variable;

(b) storing position data of the waiting position corresponding to a predetermined finder field ratio in a memory means; and (c) controlling the lens barrel to be at the waiting position corresponding to the position data stored in the memory means.

* * * * *